Figure 1:
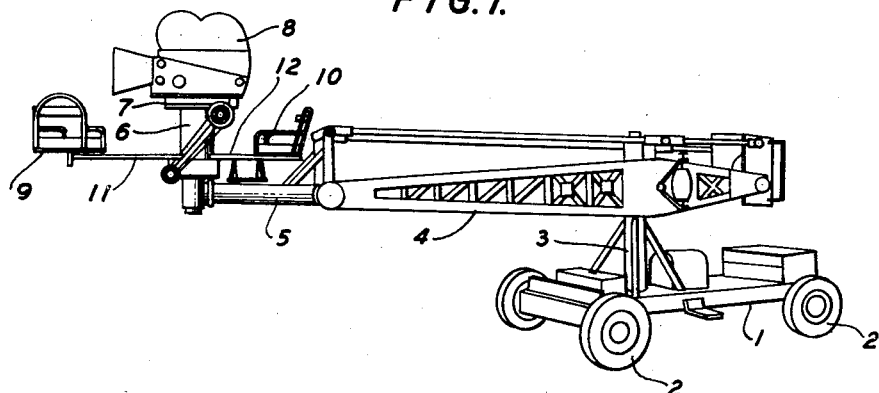

Aug. 24, 1948.  V. R. RABY  2,447,667
CAMERA CARRIAGE

Filed May 7, 1946  2 Sheets-Sheet 1

INVENTOR
VICTOR R. RABY
BY
ATTORNEY

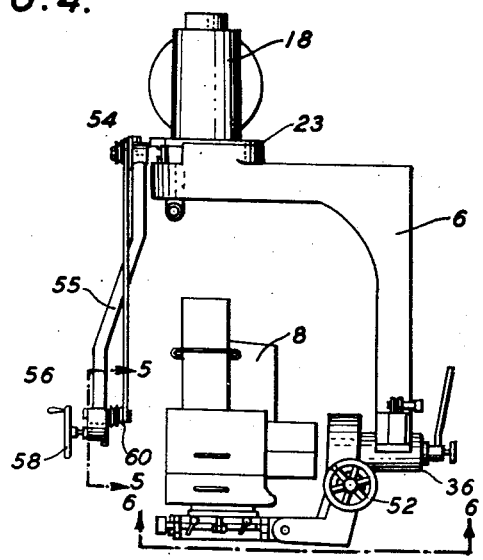
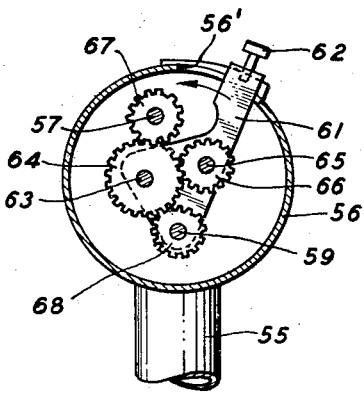
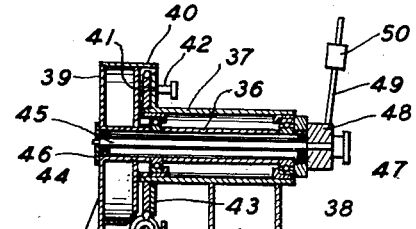
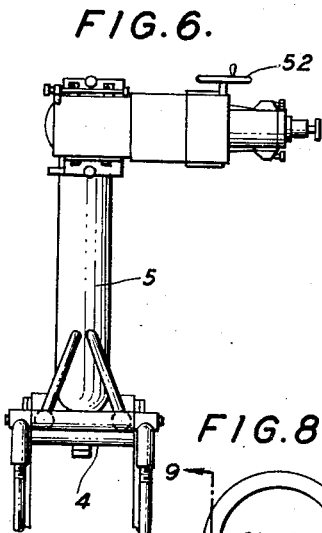
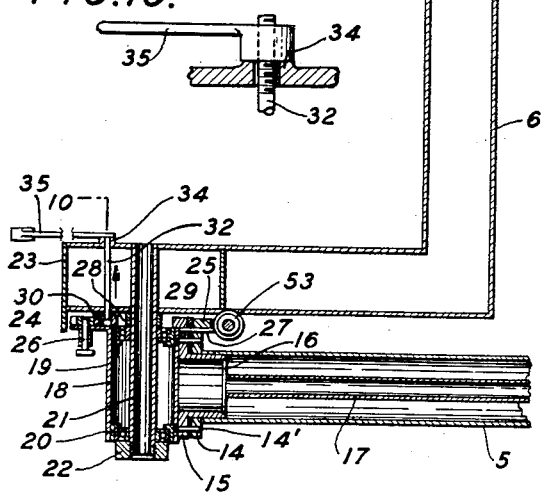
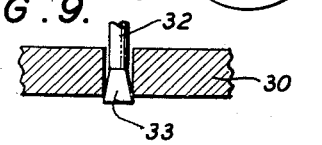

Patented Aug. 24, 1948

2,447,667

UNITED STATES PATENT OFFICE 2,447,667

CAMERA CARRIAGE

Victor R. Raby, Los Angeles, Calif.

Application May 7, 1946, Serial No. 667,973

5 Claims. (Cl. 248—183)

This invention concerns portable camera mounts and the like which are mounted upon trucks for easy carriage and manipulation. The type and kind of camera is of no particular moment as the mount herein disclosed may be employed for support of any heavy device which is to be shifted into a variety of different positions. The invention has its greatest use in supporting motion picture cameras and/or sound equipment along with other associated devices which must be moved from place to place about studio lots, stages and other locales.

The camera mount is so arranged, positioned and constructed that the mount can be easily and quickly shifted vertically and horizontally and also rotated to a complete inverted position to place the lens of the camera, which is in a fixed relationship to the mount, to a very low elevation for special floor and ground level scenes, or raised to a very high level for overhead scenes.

So far as known, the present mobile camera supports employed by the movie industry do not have the versatility desired in that they cannot be used for overhead or high level shots and then quickly swung to a very low floor level. The camera support of this invention, however, can be shifted down to the very surface along the floor or ground and thus place the lens of the camera at a mere few inches above the floor.

One of the principal objects of this invention is to present a new and novel means for supporting cameras and the like, along with associated equipment, which is freely mobile and capable of being quickly and easily placed at any vertical and horizontal position from floor level to any height depending upon the length of the boom and its support, which support may be variable also.

Another object is to provide a camera support which is versatile in manipulation in an upright or inverted position, a support which is simple and sturdy in construction, and which is economical to make and manufacture.

Still another object is to provide a camera mount which can be rotated through 360° with perfect control in safety upon either a vertical or horizontal axis, means being provided to pan the camera mount by convenient mechanism which is made to manipulate the mount in the same direction without changing the direction of movement, whether the mount is above or below a supporting boom.

Other objects, advantages and features of my invention will appear from the accompanying drawings, the subjoined detailed description, the preamble of these specifications and the appended claims.

Applicant is about to illustrate and describe one of the forms of his invention in order to teach one how to make, and use the same, but it is to be understood that the drawings and description thereof are not to limit the invention in any sense whatsoever, except as limited by the appended claims.

Figure 3:
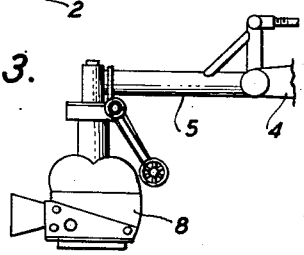
Figure 2:
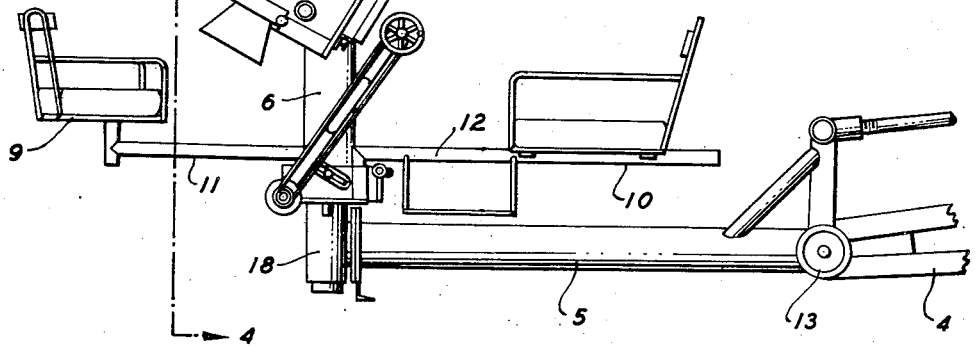

In the drawings:

Fig. 1 is a perspective view showing a complete mobile camera supporting device employing the new and novel camera mount of this invention, Fig. 2 is an enlarged side elevational view of the distal end of the boom showing the invention with its parts in normal operating position, Fig. 3 is another side elevational view of the distal end of the boom, on a somewhat smaller scale, showing the bracket of the camera mount in an inverted position, but with the chairs removed, Fig. 4 is an enlarged front elevational view showing the camera mount below the boom.

Fig. 5 is an enlarged vertical view of a shifting mechanism with parts thereof in section, this view being taken substantially along line 5—5 of Fig. 4, Fig. 6 is an inverted plan view taken substantially along line 6—6 of Fig. 4, Fig. 7 is a vertical sectional view, enlarged, showing details of internal construction of the camera mount, bracket, and the distal end of the boom, Fig. 8 is a plan view of the brake ring employed in the invention, Fig. 9 is a detail taken substantially along line 9—9 of Fig. 8, Fig. 10 is a detail showing of a brake control taken substantially along line 10—10 of Fig. 7.

The device is illustrated as attached to a truck or carriage 1 having a plurality of rubber tired wheels 2, and an upstanding standard or tube 3 which is provided with any suitable means for raising and lowering a balanced boom 4. The details of the truck and boom is of no particular moment in this invention in that these parts may be of any suitable kind for the purpose, a number of which are now old in the art.

The distal end of the boom is provided with a neat, extended and cylindrical portion 5 which supports a main camera platform supporting member or main bracket 6. The platform is indicated at 7 and the camera at 8. The chairs 9 and 10 may be removably supported in any suitable manner upon the main bracket 6, at the base thereof, by the extended structural members 11 and 12, respectively; these members being removable from their respective sockets of the bracket whenever desired. These parts are known to be old in the art and no claim is made to them except as a means associated with this invention to make the entire device useful.

The tubular extended part 5 is hinged at 13 to the end of the fabricated boom 4, the distal end of the part 5 having an annular flange 14 which is in sliding engagement with a similar annular flange 15 that is fixed to a rotatable cup-like bearing 16. The bearing 16 is fixed to the end of a shaft 17, the other end of this shaft having a suitable bearing in the hinged coupler 13. One or more quick removable bolts 14' are provided in the flanges 14 and 15 to prevent one turning on the other unless these bolts are removed, and they are designed to be removed when the operator wishes to place the bracket 6 below the boom end 5. The cuplike bearing is fixed to one side of the housing of a vertical bearing member 18. This member has the upper and lower ball bearing parts 19 and 20 which provide lateral support for a vertical shaft 21, the bottom end of this shaft being journalled in the bearing block 22 which is securely fixed to the bottom end of the bearing member 18.

Fixed to the top of the shaft 21, there is a round shallow housing 23 having the annular depending flange 24 which provides a protected chamber for a gear 25, this gear being free wheeling unless arrested by the spring pin 26, this pin having a point which passes through the plate 27 that is fixed to the sleeve 28 of the bottom wall of the housing 23, as shown. The plate 27 has an upstanding annular short wall 29 within which there is a brake band 30 having slightly spaced apart ends to make a gap 31 which accommodates the pull rod 32. The bottom end of the pull rod has a tapered portion 33, and the top of the pull rod has a threaded end with a nut 34 to which is attached the lever 35, the top of the rod passing through a hole in the top cover of the housing. When the lever is turned in one direction, the nut 34 works down on the threads of the rod and pulls the tapered portion 33 upwardly to spread the ends of the brake band and thus force the outer sides of the band against the upstanding annular flange, that is, the inner surface of the short wall 29; this action causes sufficient quick pressure of the brake to stop or hold the entire upper member 6 and its associated parts.

At the top of the main bracket 6, there is a cylindrical bearing housing 36 which is provided with the roller bearings 37 and 38. At one end of this housing, there is shallow cylindrical housing 39 which has its axis in alinement with the axis of the housing 36. The housing 39 has the flanges or annular extending wall 40 which provides a protective chamber for a gear 41, this gear is fixed to the housing 36 by the spring urged finger release means 42 and the flanged plate 43 which is a part of the housing 36. The housing 39 has its bearing support at 44 which is a hollow shaft that is supported by the bearings 37 and 38, as shown. Within the hollow shaft there is a rod 45 having a plate 46 which is fixed to the housing 39, the other end of this rod having the bearing support 47 to support it within the housing 36 and a sleeve 48 fixed thereto from which extends a rod 49 having the adjustable weight 50. The purpose of this weight is to counter-balance, to some degree, the radial displacement of the camera supporting platform 7. Fixed to the platform side 7' of the platform are the supporting bearing blocks of a worm 51, which worm, when rotated by a hand wheel 52, works around the circumference of the normally fixed gear 41 and thus pans the platform 7.

In order to rotate the entire arm support 6 at the end of the boom 5, a worm 53 is provided, see Fig. 7, which is in mesh with the gear 25, the bearing blocks of this worm are fixed to the housing 23, and at one end of this worm there is a hand pulley wheel 54. From the housing 23 is supported an extended arm 55, and at the distal end of this arm, there is fixed thereto a housing 56. Within the housing, see Fig. 5, there is journalled to the housing a hand wheel shaft 57 having the attached exterior hand wheel 58, a pulley shaft 59 having the exterior pulley wheel 60, and pivoted to this latter shaft there is the end of a shifter lever 61 which has a finger grip end 62 exterior of the housing, and which lever passes through a slot 56' in the housing. The lever is shaped as shown and has pivoted to a portion thereof a shaft 63 which supports a gear 64 and another shaft 65 which supports a gear 66. The gear 67 is keyed to the shaft 57 and a gear 68 is keyed to the shaft 65, all gears being sized and positioned to cause the entire arm 6 to rotate in a certain direction when the hand wheel 58 is rotated clockwise and in the opposite direction when the hand wheel 58 is rotated counterclockwise, but when the camera platform is above the boom 5, the lever 61 is shifted so as to mesh gears 66 and 67, and this action causes the arm 6 to swing in the same direction by the same operation of the hand wheel 58.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. In a device for supporting a camera platform in various positions above and below the end of a boom, a shiftable boom, portable means supporting the boom, a camera supporting platform at the distal end of the boom, bracket means connecting the platform with the distal end of the boom, the bracket means comprising an L-shaped element having one leg thereof pivoted to the boom for movement in two directions with their axes at right angles to one another and another leg connected by pivoted means to the platform, counterpoise means extending from the platform with an adjustable weight thereon.

2. The device for supporting a camera platform recited in claim 1 wherein the pivot means includes a rotary control means having a transmission unit, shiftable means in the unit constructed to make the bracket rotate in one direction when the control means is rotated clockwise with the bracket above or below the boom and to cause the bracket to rotate in the opposite direction when the control means is rotated counterclockwise with the platform in a position either above or below the boom end.

3. In a portable camera supporting device, a shiftable boom having an L-shaped member pivoted to a distal end thereof, the member having a leg which can be set parallel to the longitudinal axis of the boom, means pivoting the leg to the boom including a universal-like joint, a platform having a top camera supporting surface, an arm extending from the platform which is pivoted to another leg of the L-shaped member for movement about an axis which can be set parallel to the longitudinal axis of the boom, said pivoting means allowing the platform to be swung to various positions above and below the boom while allowing the platform surface to be kept upwardly.

4. The device recited in claim 3 wherein mechanical means are provided for rotating the L-shaped member and the platform therewith around the boom, said mechanical means having controls located in a convenient position where an operator is accommodated, said mechanical means including a pair of meshed gears on a lever adapted to be shifted to a position between a pair of regular gears, a pair of spaced regular gears in which one of them is connected to a hand operating wheel and the other to means for rotating the member, the gears on the lever making it possible to rotate the member in the same direction whether it is above or below the boom.

5. In a device for supporting a camera in various positions, a shiftable boom, a camera platform mounted upon a shiftable arm which is pivoted to and extends from an end of the boom permitting the platform to be positioned below or above the boom, means pivoting the arm to the boom including a gear element and a worm element with one of the elements journalled to the arm and the other element releasably fixed to the boom, means for operating one of the elements convenient to the platform, the latter means including a set of gears journalled on a shiftable lever so that the arm can be made to rotate in a certain given direction with the same directional movement of the hand wheel when the platform is above or below the boom.

VICTOR R. RABY.

REFERENCES CITED

The following references are of record in the file of this patent:

UNITED STATES PATENTS

| Number | Name | Date |
|---|---|---|
| 1,855,964 | Higginbotham | Apr. 26, 1932 |
| 2,073,998 | Raby | Mar. 16, 1927 |
| 2,224,901 | Cunningham | Dec. 17, 1940 |
| 2,306,562 | Phillips | Dec. 29, 1942 |